(12) United States Patent  
Wiacek

(10) Patent No.: US 12,177,804 B2
(45) Date of Patent: Dec. 24, 2024

(54) SYNCHRONIZING TERMINAL DEVICE TO NETWORK CLOCK

(71) Applicant: Nokia Technologies Oy, Espoo (FI)

(72) Inventor: Fabian Wiacek, Warsaw (PL)

(73) Assignee: Nokia Technologies Oy, Espoo (FI)

( * ) Notice: Subject to any disclaimer, the term of this patent is extended or adjusted under 35 U.S.C. 154(b) by 343 days.

(21) Appl. No.: 17/791,132

(22) PCT Filed: Apr. 29, 2020

(86) PCT No.: PCT/IB2020/054026
§ 371 (c)(1),
(2) Date: Jul. 6, 2022

(87) PCT Pub. No.: WO2021/220034
PCT Pub. Date: Nov. 4, 2021

(65) Prior Publication Data
US 2023/0047260 A1 Feb. 16, 2023

(51) Int. Cl.
*H04W 56/00* (2009.01)
(52) U.S. Cl.
CPC ..... *H04W 56/0015* (2013.01); *H04W 56/006* (2013.01)
(58) Field of Classification Search
CPC .................................................. H04W 56/006
See application file for complete search history.

(56) References Cited

U.S. PATENT DOCUMENTS

| 2015/0105097 A1* | 4/2015 | Sun ........................... G01S 5/06 455/456.1 |
| 2016/0309434 A1 | 10/2016 | Regev |
| 2017/0034800 A1 | 2/2017 | Abedini et al. |
| 2019/0271989 A1 | 9/2019 | Guo et al. |

FOREIGN PATENT DOCUMENTS

| CN | 1505279 A | 6/2004 |
| CN | 110324889 A | 10/2019 |
| CN | 110557823 A | 12/2019 |

(Continued)

OTHER PUBLICATIONS

International Search Report and Written Opinion received for corresponding Patent Cooperation Treaty Application No. PCT/IB2020/054026, dated Feb. 17, 2021, 11 pages.

(Continued)

*Primary Examiner* — Won Tae C Kim
(74) *Attorney, Agent, or Firm* — Barta Jones, PLLC

(57) ABSTRACT

This document discloses a solution for synchronizing a terminal device to a network clock. According to an aspect, a method comprises as performed by the terminal device: receiving a control message from at least one access node, the control message comprising a first clock value indicating a transmission time of the control message; determining a geographical location of the terminal device and a geographical location of the at least one access node; computing, on the basis of the geographical locations of the terminal device and the at least one access node and further on the basis of the first clock value transmission time of the control message, a second clock value indicating a reception time of the control message at the terminal device; and updating a clock of the terminal device by using the second clock value.

20 Claims, 5 Drawing Sheets

(56) References Cited

FOREIGN PATENT DOCUMENTS

EP          1427121  A1     6/2004
EP          3316660  A1     5/2018

OTHER PUBLICATIONS

"5G E2E Technology to Support Verticals URLLC Requirements", NGMN Alliance, Version 1.5, Oct. 7, 2019, pp. 1-50.
Notice of Allowance received for corresponding European Patent Application No. 20723558.1, dated Jul. 4, 2023, 7 pages.
Office action received for corresponding Chinese Patent Application No. 202080096677.3, dated Oct. 10, 2023, 6 pages of office action and no page of translation available.

* cited by examiner

SYNCHRONIZING TERMINAL DEVICE TO NETWORK CLOCK

RELATED APPLICATION

This application was originally filed as PCT Application No. PCT/IB2020/054026, filed on Apr. 29, 2020, which is incorporated herein by reference in its entirety.

FIELD

Various embodiments described herein relate to the field of cellular communications and, particularly, to synchronizing a clock of a terminal device.

BACKGROUND

Terminal devices or user equipment (UE) of a cellular communication system may use a clock or a reference time for various purposes. Some applications executed in the terminal devices may require a system clock. In communications with network nodes of the cellular communication system, the system clock may be used to time transmissions and/or receptions.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided ab apparatus comprising means for performing: receiving a control message from at least one access node, the control message comprising a first clock value indicating a transmission time of the control message; determining a geographical location of the apparatus and a geographical location of the at least one access node; computing, on the basis of the geographical locations of the apparatus and the at least one access node and further on the basis of the first clock value transmission time of the control message, a second clock value indicating a reception time of the control message at the apparatus; and updating a clock of the apparatus by using the second clock value.

In an embodiment, the means are configured to receive the control message, compute the clock value, and update the clock in an idle state.

In an embodiment, the means are configured to compute the second clock value by using time-of-arrival positioning and to determine the geographical position of the apparatus by using a positioning method other than the time-of-arrival positioning.

In an embodiment, the control message is a first control message received from a first access node and further comprises at least one information element indicating a geographical location of the first access node, wherein means are configured to further: receive, from a second access node, a second control message comprising a third clock value indicating a transmission time of second control message and at least one information element indicating a geographical location of the second access node; receive, from a third access node, a third control message comprising a fourth clock value indicating a transmission time of third control message and at least one information element indicating a geographical location of the third access node; record reception times of the first control message, second control message, and third control message by using the clock of the apparatus, and determine the geographical location of the apparatus together with the second clock value by using time-of-arrival positioning algorithm, the geographical locations of the access nodes, and the recorded reception times contained in the first control message, second control message and third control message.

In an embodiment, the means are configured to select one of the first clock value, third clock value, and fourth clock value as a reference clock value, to determine the geographical location of the apparatus by using a time difference between the reference clock value and the other clock values of the first clock value, third clock value, and fourth clock value, and to compute the second clock value as relative to the reference clock value in the time-of-arrival positioning algorithm.

In an embodiment, the means are configured to receive the control message from multiple access nodes in a synchronous manner, wherein clocks of the multiple access nodes are synchronized to a common clock.

In an embodiment, the means are configured to receive the control message and further control messages from multiple access nodes that are asynchronous with respect to one another and to compute the second clock values by using the control messages.

In an embodiment, the means are configured to update the clock of the apparatus to the first clock value before computing the second clock value.

In an embodiment, the means comprise at least one processor and at least one memory including computer program code, the at least one memory and computer program code configured to, with the at least one processor, cause the performance of the apparatus.

According to an aspect, there is provided a method comprising: receiving, by a terminal device, a control message from at least one access node, the control message comprising a first clock value indicating a transmission time of the control message; determining, by the terminal device, a geographical location of the terminal device and a geographical location of the at least one access node; computing, by the terminal device on the basis of the geographical locations of the terminal device and the at least one access node and further on the basis of the first clock value transmission time of the control message, a second clock value indicating a reception time of the control message at the terminal device; and updating a clock of the terminal device by using the second clock value.

In an embodiment, the terminal device receives the control message, computes the clock value, and updates the clock in an idle state.

In an embodiment, the terminal device computes the second clock value by using time-of-arrival positioning and determines the geographical position of the terminal device by using a positioning method other than the time-of-arrival positioning.

In an embodiment, the control message is a first control message received from a first access node and further comprises at least one information element indicating a geographical location of the first access node, the method further comprising as performed by the terminal device: receiving, from a second access node, a second control message comprising a third clock value indicating a transmission time of second control message and at least one information element indicating a geographical location of the second access node; receiving, from a third access node, a third control message comprising a fourth clock value indicating a transmission time of third control message and at least one information element indicating a geographical location of the third access node; recording reception times of the first control message, second control message, and third control message by using the clock of the terminal device, and determining the geographical location of the terminal device together with the second clock value by using time-of-arrival positioning, the geographical locations of the access nodes, and the recorded reception times contained in the first control message, second control message and third control message.

In an embodiment, the terminal device selects one of the first clock value, third clock value, and fourth clock value as a reference clock value, determines the geographical location of the terminal device by using a time difference between the reference clock value and the other clock values of the first clock value, third clock value, and fourth clock value, and computes the second clock value as relative to the reference clock value in the time-of-arrival positioning.

In an embodiment, the terminal device receives the control message from multiple access nodes in a synchronous manner, wherein clocks of the multiple access nodes are synchronized to a common clock.

In an embodiment, the terminal device receives the control message and further control messages from multiple access nodes that are asynchronous with response to one another and computes the second control value by using the control messages.

In an embodiment, the terminal device updates the clock of the terminal device to the first clock value before computing the second clock value.

According to an aspect, there is provided a computer program product embodied on a computer-readable medium and comprising a computer program code readable by a computer, wherein the computer program code configures the computer to carry out a computer process comprising in a terminal device: receiving a control message from at least one access node, the control message comprising a first clock value indicating a transmission time of the control message; determining a geographical location of the terminal device and a geographical location of the at least one access node; computing, on the basis of the geographical locations of the terminal device and the at least one access node and further on the basis of the first clock value transmission time of the control message, a second clock value indicating a reception time of the control message at the terminal device; and updating a clock of the terminal device by using the second clock value.

In an embodiment, the computer program product further comprising a computer program code that configures the computer to carry out all the steps of any one of the above-described methods.

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
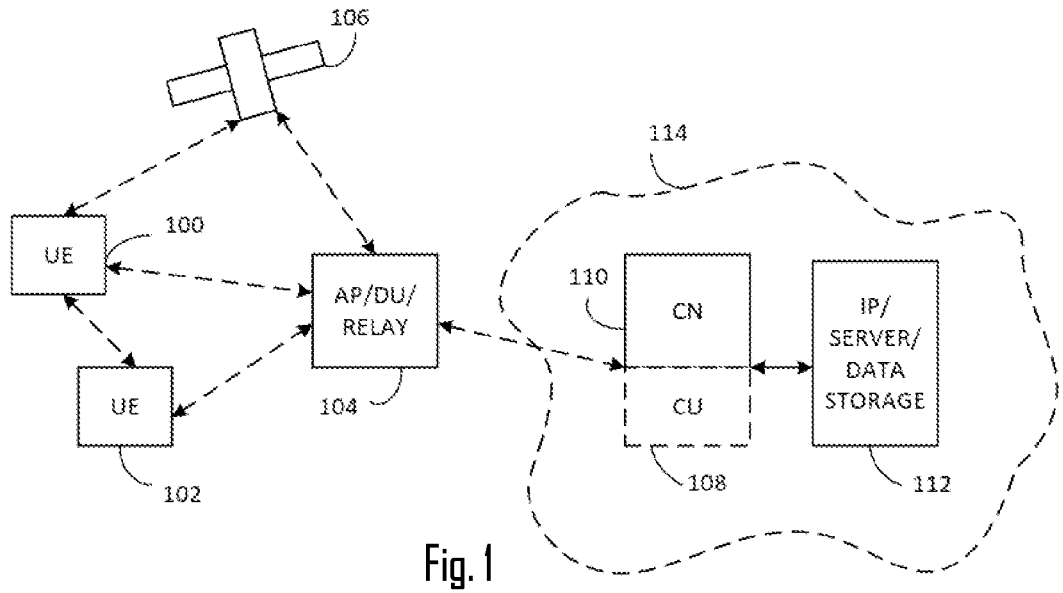

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network. FIG. 1 shows terminal devices or user devices 100 and 102 configured to be in a wireless connection on one or more communication channels in a cell with an access node (such as (e/g)NodeB) 104 providing the cell.

(e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The (e/g)NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)NodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As described in Background, the terminal device 100 may require a network time or network clock for various purposes. The network clock may be used for one or more application executed in the terminal device, e.g. for time-stamping measurement data in a sensor device. The network clock may be used for communicating in the network, e.g. with one or more access nodes 104. For example, a timing advance or uplink transmissions in general may utilize the network clock to time an uplink transmission. However, a clock of a terminal device may drift over time and require resynchronization. For example, when the terminal device is powered up, the clock may be out-of-sync with the network clock.

Figure 2:
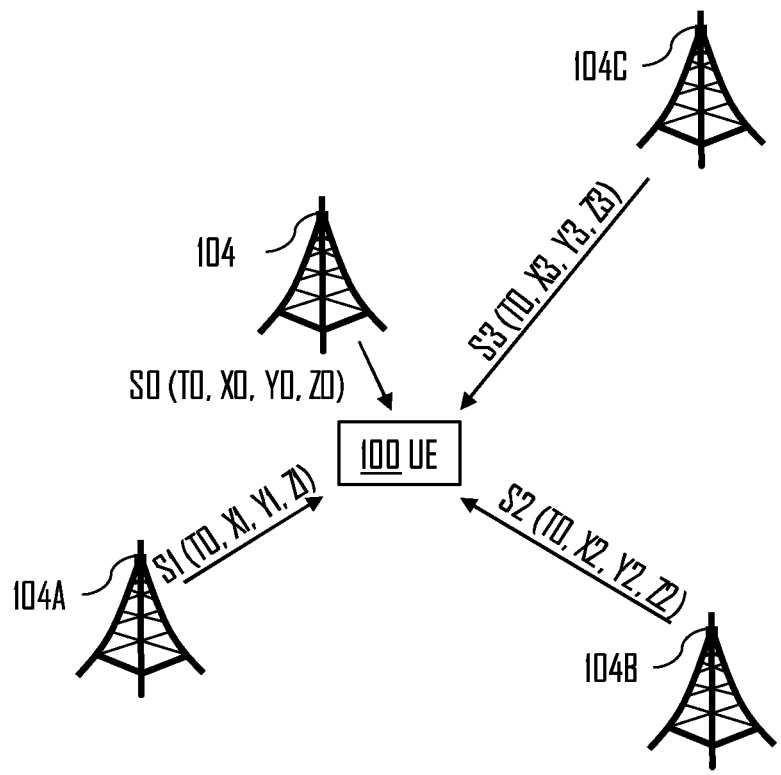
FIG. 2 illustrates a system for trilateral positioning of a terminal device according to some embodiments.
Figure 3:
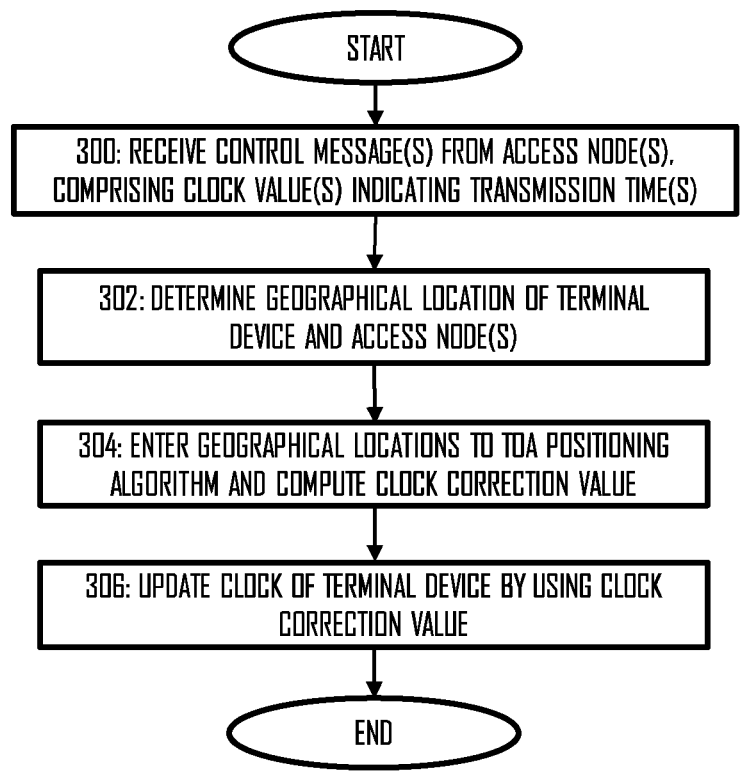
FIG. 3 illustrates a process for synchronizing a terminal device to a network clock by using positioning.

Embodiments of FIGS. 2 and 3 illustrate a procedure for synchronizing a terminal device to the network clock by using a positioning method. The procedure may be carried out in an apparatus for the terminal device 100. Referring to FIG. 3, the procedure comprises: receiving (block 300) a control message from at least one access node, the control message comprising a first clock value indicating a transmission time of the control message; determining (block 302) a geographical location of the apparatus and a geographical location of the at least one access node; computing (block 304), on the basis of the geographical locations of the apparatus and the at least one access node and further on the basis of the first clock value transmission time of the control message, a second clock value indicating a reception time of the control message at the apparatus; and updating (block 306) a clock of the apparatus by using the second clock value.

In an embodiment, block 304 is performed by using a time-of-arrival (TOA) positioning algorithm which is an example of multi-lateration positioning of a mobile device. The multi-lateration may be based on signals exchanged between the terminal device and multiple fixed anchor nodes, e.g. access nodes 104, 104A, 104B, 104C in FIG. 2. In some multi-lateration methods, the terminal device transmits a signal which is received by the anchor nodes. The clocks of the anchor nodes are synchronized, and the position of the terminal device may be computed by comparing time differences between reception times of the signal at the anchor nodes. Four nodes may be required where three nodes are needed for the location coordinates and the fourth node provides a time reference for the time difference computation. An example of such a multi-lateration method is an Observed Time Difference of Arrival (OTDOA) technique known in the literature. However, some embodiments of the invention use reversed transmission direction. As illustrated in FIG. 2 and the procedure of FIG. 3, the anchor nodes (the access nodes) transmit the control message for the positioning to the terminal device. However, instead of using the control message(s) for positioning the terminal device, or in addition to the positioning, the terminal device may compute the network clock from the control message(s) by using the TOA positioning algorithm.

In an embodiment, the terminal device performs the procedure of FIG. 3 in an idle state. In other words, the terminal device needs not to access the network and consume (uplink) signalling resources for acquiring the network clock.

Let us consider the scenario of FIG. 2 where the access nodes 104 to 104C transmit respective control messages S0 to S3 to the terminal device 100. Each control message may comprise the clock value of the access node at the time of transmitting the respective control message, e.g. T0 in the embodiment of FIG. 2. In this embodiment, the access nodes may be synchronized to one another and transmit the control messages simultaneously. In other embodiments described below, the access nodes may transmit the control messages at different times. Furthermore, each control message may comprise at least one information element indicating the location of the access node. In the control message transmitted by the access node 104, information elements X0, Y0, Z0 may indicate the three-dimensional coordinates of the access node 104. Similarly, the other access nodes 104A to 104C may transmit their respective X, Y, and Z coordinates as illustrated in FIG. 2. In case the coordinates are provided in a two-dimensional manner, Z coordinates may be omitted.

Figure 4:
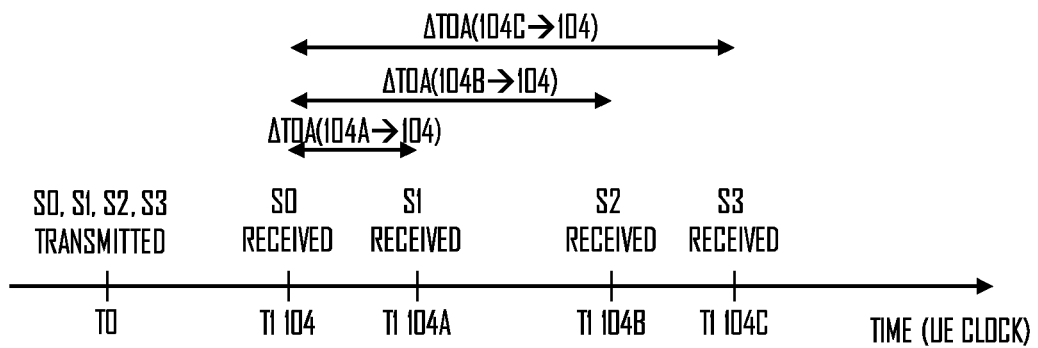
FIG. 4 illustrates reception timing of positioning signals.

FIG. 4 illustrates an example of reception times of the messages S0 to S3 at the terminal device 100. Let us assume for the sake of simplicity that all the control messages S0 to S3 were transmitted at the same time $T_0$, as illustrated in FIG. 4. S0 is received from the closest access node 104 first at time $T_{1\ 104}$, S1 is received at time $T_{1\ 104A}$, S2 is received at time $T_{1\ 104B}$, and S3 is received at time $T_{1\ 104C}$. The reception times are proportional to the distances between the terminal device 100 and the respective access nodes 104 to 104C, as illustrated in FIG. 2. As a consequence, the differences between the reception times may be used to compute the location of the terminal device 100 when the locations of the access nodes 104 to 104C are also known, by using the following TOA positioning equations:

$$\sqrt{(x_{UE} - x_{104})^2 + (y_{UE} - y_{104})^2 + (x_{UE} - x_{104})^2} = c(T_{1\ 104} - T_{0\ 104}) \quad (1)$$

$$\sqrt{(x_{UE} - x_{104A})^2 + (y_{UE} - y_{104A})^2 + (z_{UE} - z_{104A})^2} = \quad (2)$$
$$c(\Delta TOA_{104A \to 104} + T_{1\ 104} - T_{0\ 104A})$$

$$\sqrt{(x_{UE} - x_{104B})^2 + (y_{UE} - y_{104B})^2 + (z_{UE} - z_{104B})^2} = \quad (3)$$
$$c(\Delta TOA_{104B \to 104} + T_{1\ 104} - T_{0\ 104B})$$

$$\sqrt{(x_{UE} - x_{104C})^2 + (y_{UE} - y_{104C})^2 + (z_{UE} - z_{104C})^2} = \quad (4)$$
$$c(\Delta TOA_{104C \to 104} + T_{1\ 104} - T_{0\ 104C})$$

In the Equations $x_{104}$, $y_{104}$, and $z_{104}$ represent the location coordinates of the access node 104 in Equation (1) and, analogously, for the other access nodes 104A to 104C in Equations (2) to (4). Similarly, the location of the terminal device as respective location coordinates is represented by $x_{UE}$, $y_{UE}$, and $z_{UE}$. As illustrated in FIG. 4, $\Delta TOA_{104A \to 104}$ represents a time difference between reception times of message S0 and S1 in Equation (2) and, analogously, between the messages S0 and S2 and S0 and S3 in Equations (3) and (4). Following Equations represent the time differences:

$$\Delta TOA_{104A \to 104} = T_{1\ 104A} - T_{1\ 104} \quad (5)$$

$$\Delta TOA_{104B \to 104} = T_{1\ 104B} - T_{1\ 104} \quad (6)$$

$$\Delta TOA_{104C \to 104} = T_{1\ 104C} - T_{1\ 104} \quad (7)$$

c represents the speed of light. $T_0$ that represents the transmission time is the same for all access nodes 104 to 104C in this embodiment, although in other embodiments the transmission times may differ. Each access node may provide in the respective control message the x, y, and z location coordinates of the access node and, additionally the transmission time $T_0$ of the control message in the form of a clock value. Now, the only remaining unknown values in Equations (1) to (4) are the coordinates of the terminal device and the value of $T_{1\ 104}$, i.e. the reception time of the control message from the access node 104 as represented in the clock value of the access node 104. The reason is that the terminal device is currently unaware of the network clock and also unaware of the distance to the access node 104. In other words, there are four Equations and four unknown parameters from which all the unknown parameter can be solved with conventional mathematics. Once the terminal device has computed the value of $T_{1\ 104}$, it can solve the propagation delay ($T_{1\ 104} - T_{0\ 104}$) between the access node 104 and the terminal device 100 and acquire the reception time of $T_{1\ 104}$ in the form of the clock value of the access node 100 by using the transmission time value $T_{0\ 104}$ and the propagation delay. As a consequence, the terminal device acquires the value of the network clock at the time of receiving the control message S0 and update its internal clock so that it is now synchronized with the network clock. A processing delay between the time value $T_{1\ 104}$ and the time of updating the internal clock may be determined by using the internal clock of the terminal device and taken into account in the update.

Figure 5:
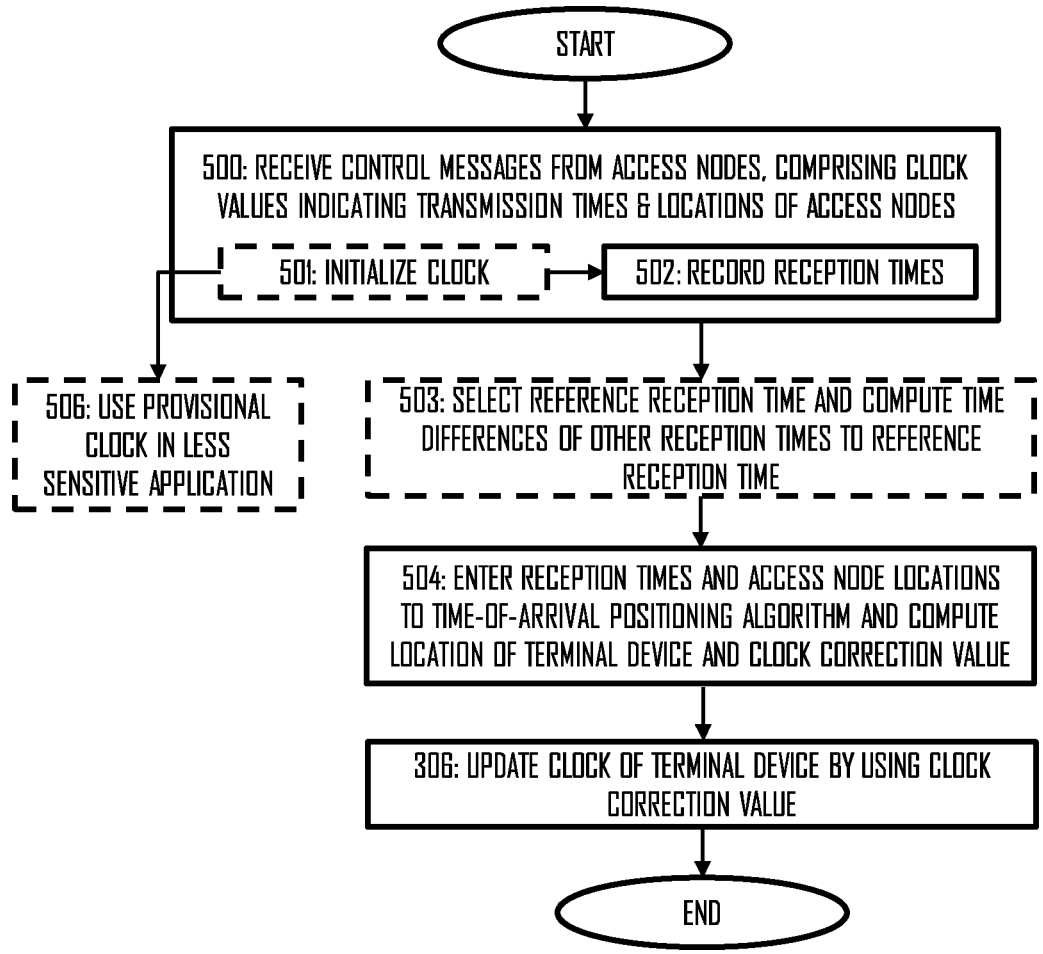
FIG. 5 illustrates a process for positioning and clock synchronization in the terminal device according to an embodiment.

FIG. 5 illustrates an embodiment of the above-described procedure performed in the terminal device. Referring to FIG. 5, let us assume an initial situation where the terminal device is in an idle state, e.g. has just powered up and is searching for a network. In such a cell search procedure, the terminal device may search for broadcast signals transmitted by access nodes of the network. Upon detecting such one or more broadcast signals, the terminal device may select at least the strongest of the broadcast signals and extract system information comprised in the broadcast signal. The broadcast signals may be embodiments of the above-described control message. The terminal device may decode, for example, a master information block (MIB) and system information blocks (SIB) from the broadcast signals. For example, the x, y, and z coordinates of the access node may be provided in SIB16 message. Similarly, the transmission time To of the control message may be comprised in the broadcast signals. The clock values may be provided in a format of HH:MM:SS:MS:US:NS, e.g. 12:00:00:000:000: 000. In other words, the clock values are represented in the form of hours:minutes:seconds:milliseconds:microseconds: nanoseconds. Embodiments may employ only some of the fields due to very short propagation delays, e.g. values of MS:US:NS.

Now, associating this with the description above, the terminal device receives the control messages S0 to S3 from the access nodes 104 to 104C, e.g. during the cell search. Upon receiving the control messages, the terminal device may record a reception time of each control message by using the internal clock of the terminal device which is now asynchronous with the network clock (block 502).

In an embodiment, the terminal device selects one of the clock values comprised in the received control values as a reference clock value and updates the internal clock of the terminal device to the reference clock value (block 501). In this embodiment, the terminal device updates the clock of the apparatus to a network clock value before computing the network clock value that is synchronous with the network clock. For example, let us assume that the transmission times $T_0$ are as follows:

104: $T_{0\ 104}$=xx:yy:zz:aaa:000:000
104A: $T_{0\ 104A}$=xx:yy:zz:aaa:025:000
104B: $T_{0\ 104B}$=xx:yy:zz:aaa:100:000
104C: $T_{0\ 104C}$=xx:yy:zz:aaa:200:000

Only fields US:NS are considered herein. The terminal device may select the lowest clock value as the reference clock value because it is transmitted by an access node closest to the terminal device and is currently closest to the real network clock value. Let us now assume that the terminal device initializes its internal clock to the clock value $T_{0\ 104}$ of the access node 104, and let us denote the resulting clock value by CLK(104). The reference clock value is now asynchronous with the network clock by the amount of the propagation delay between the terminal device and the access node that transmitted the reference clock value. However, the clock value may still be accurate enough for certain applications or functions executed in the terminal device. As a consequence, the reference clock values may be used in one or more applications or functions that are less sensitive to the synchronization with the network clock (block 506). Examples of such applications include certain measurement applications, e.g. when the terminal device is comprised in an internet-of-things (IoT) sensor device, or a monitoring application.

Upon receiving the sufficient number of control messages and recording the reception times, the terminal device may input the required information to the TOA positioning algorithm (block 504). Suffice to say that the reception times provided as values of the internal clock of the terminal device are asynchronous with the network clock by the amount of the propagation delay to the access node that transmitted the reference clock value. In an embodiment, the terminal device selects a reference reception time and computes the time differences (Equations (5) to (7)) by using the recorded reception times that have been recorded by using the terminal devices internal clock that is still asynchronous with the network clock. The reference reception time may be associated with the control message the terminal device used to acquire the reference clock value. Assuming the reference clock value is the clock value transmitted by the access node 104 (000:000), Equations (5) to (7) output the following time differences:

$$\Delta TOA_{104A \rightarrow 104} = 025{:}000$$

$$\Delta TOA_{104B \rightarrow 104} = 100{:}000$$

$$\Delta TOA_{104C \rightarrow 104} = 200{:}000$$

In block 504, the terminal device may insert the location coordinates of the access nodes, transmission times, and the time differences to the Equations (1) to (4) and compute the location of the terminal device in x, y, and z coordinates and the value of $T_{1\ 104}$. When $T_{1\ 104}$ is known, the terminal device may compute the propagation delay between the terminal device and the access node 104 by using the following Equation:

$$\Delta T_{propD1} = T_{1\ 104} - T_{0\ 104} \quad (8)$$

Now, the terminal device may update its clock value to be synchronous with the network clock by using the following Equation:

$$CLK(UE) = CLK(104) + T_{1\ 104} - T_{0104} \quad (9)$$

Any processing delays from the reception time of the control message S0 to the time of updating the clock may also be counted and added to Equation (9). CLK(UE) is thus synchronous with the network clock.

In embodiments where the terminal device does not require accurate synchronization with the network clock and the initialized reference clock value is considered to provide sufficient synchronization accuracy, the terminal device may executed only blocks 500, 501, and 506. In other words, the TOA estimation may be omitted in such embodiments. For example, if the terminal device is very close to the access node 104, the clock value $T_{0\ 104}$ may be sufficiently accurate for the applications and functions of the terminal device. The terminal device may then periodically or otherwise regularly resynchronize its clock to the $T_{0\ 104}$ transmitted by the access node 104.

Figure 6:
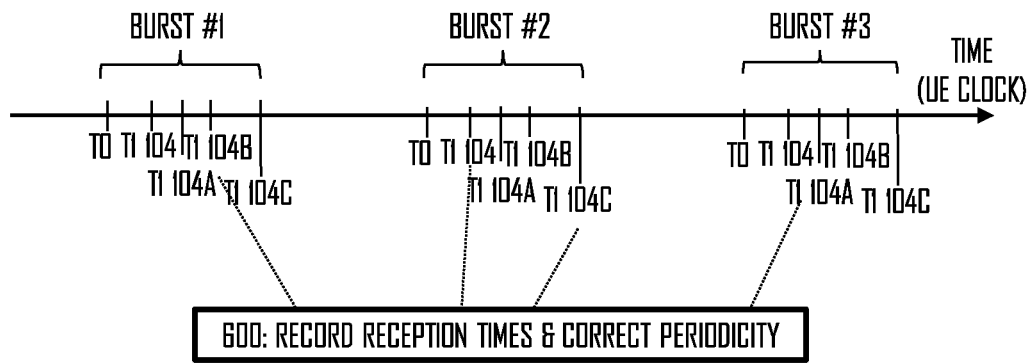
FIG. 6 illustrates an embodiment where positioning signals are transmitted at various timings.

In an embodiment, the access nodes 104 to 104C transmit the control messages in a synchronous manner, wherein clocks of the multiple access nodes are synchronized to a common network clock. The terminal device receives these synchronous transmissions. In the embodiments described above, the access nodes transmit the control signals simultaneously ($T_0$ is the same for each access node). However, in other embodiments, the terminal device acquires the control messages used in the TOA positioning algorithm as provided with different transmission times. FIG. 6 illustrates an embodiment where the access nodes transmit the control messages periodically and, as the access nodes are synchronized with one another, the periodicity may be the same. As a consequence, the terminal device may gather the control messages from different 'bursts' as illustrated in FIG. 6. For example, the terminal device may have limited capabilities of simultaneously receiving messages from multiple access nodes and, therefore, it may use the embodiment of FIG. 6. Referring to FIG. 6, each access node 104 to 104C may transmit the respective control message S0 to S3 in every burst #1 to #3. The terminal device may acquire control message S3 from the burst #1, control messages S1 and S4 from burst #2, and control message S2 from burst #3. The period may be so short that the potential mobility of the terminal device does not affect the TOA positioning. Upon gathering the control messages and when recording the reception times, the period(s) may be reduced or corrected from the recorded reception time values $T_1$ (block 600) so that the effect of different transmission periods is removed.

In an embodiment, the clocks of the access nodes 104 to 104C are asynchronous with respect to one another. Accordingly, the control messages are transmitted in an asynchronous manner and values To provided in the respective control messages may be provided on the basis of clocks that are not synchronous with one another. The above-described TOA method and respective Equations (1) to (9) are directly applicable to such embodiments as well, by allowing the different values for the $T_0$ and by removal of the effect of $T_{1\ 104}$ in Equations (2) to (4). In such embodiments, the access nodes transmitting the control messages may belong to different networks operating according to different radio access technologies. One of the access nodes may operate according to 5G specifications while another one of the access nodes may operate according to LTE or LTE-A specifications.

In another embodiment the access nodes may transmit the control messages with the different transmission times $T_0$, and the respective compensation is readily built into the above-described TOA positioning algorithm.

In the above-described embodiment, the location of the terminal device is computed in three-dimensional coordinates. However, in some embodiments the elevation (z) is not computed. Consequently, the z coordinates may be removed from Equations (1) to (4) and only three Equations are required for the two-dimensional positioning of the terminal device and acquisition of the network clock.

Figure 7:
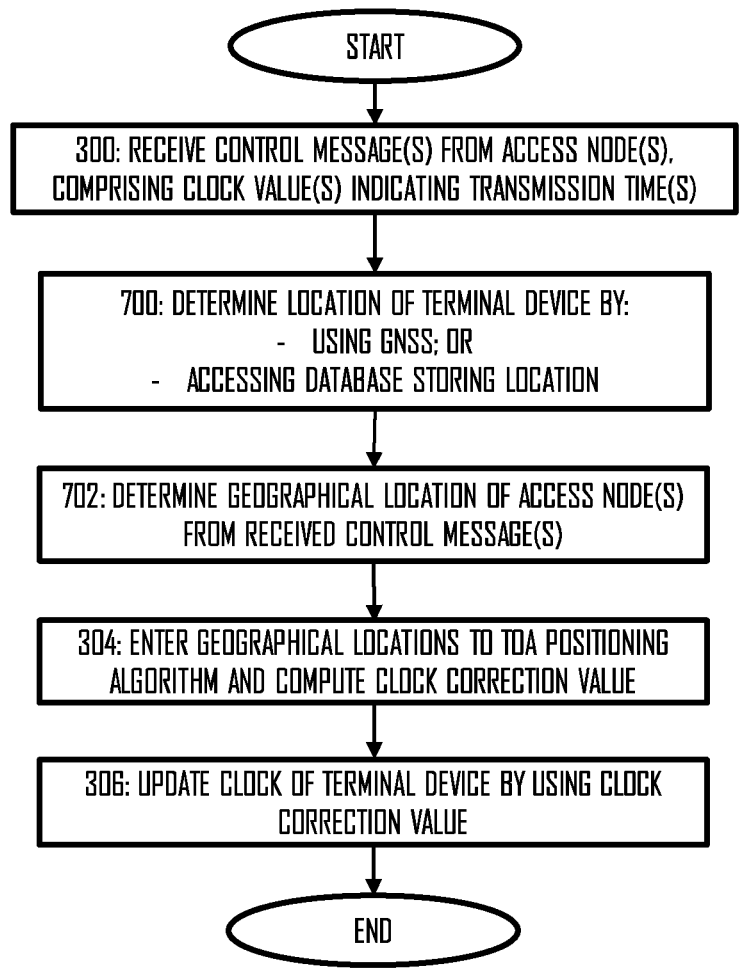
FIG. 7 illustrates a process for synchronizing a clock of the terminal device by using a first positioning method and for positioning the terminal device by using another method.

In an embodiment, the terminal device determines the geographical position of the apparatus by using a positioning method other than the time-of-arrival positioning algorithm. As a consequence, the terminal device may use the TOA positioning algorithm only for acquiring the network clock or for a purpose other than positioning the terminal device. FIG. 7 illustrates such a procedure for acquiring the network clock, e.g. in an idle state of the terminal device. In FIG. 7, the same reference numbers as in FIG. 3 represent the same or substantially similar steps of functions.

Referring to FIG. 7, block 300 may include in this embodiment reception of at least one control message from at least one access node. Since the location of the terminal device is known beforehand, only one of the Equations (1) to (4) may be sufficient for the computation of the network clock. In block 700, the terminal device determines its location and acquires the location coordinates. The actual positioning may be made in block 700 or before block 300. For example, when the terminal device is fixed to a single location, the location may be stored in the terminal device. In another embodiment, the terminal device acquires its location by using a global navigation satellite system (GNSS) such as Global Positioning System, Galileo, GLONASS, Beidou etc. Block 700 may thus comprise retrieval of the location coordinates from a memory of the terminal device or the actual positioning of the terminal device by using a positioning method other than the TOA positioning. In block 702, the terminal device determines the geographical location(s) of the access node(s) from which the control message(s) is/are received in block 300. Similarly, transmission time(s) of the control message(s) may also be determined. This may be carried out in the above-described manner. Then, the terminal device may acquire the network clock by using the known position of the terminal device by executing block 304. However, since the location of the terminal device is known, a reduced set of TOA equations are needed. Thereafter, the terminal device may update its internal clock to be synchronous with the network clock (block 306).

As described above, the above-described procedures for acquiring the network clock may be carried out while the terminal device is in the idle state. As a consequence, the terminal device does not need a radio resource control (RRC) connection or bidirectional communication with the access nodes to acquire the network clock. System specifications of the cellular network may specify requirements for periodical clock resynchronization with the network clock. The terminal device may fulfil this requirement using the TOA signalling (the control messages), still without the need for an active connection with one or more access nodes. Resulting advantages of the described embodiments include reduction or even avoidance of radio resources allocations for acquiring the network clock. Accordingly, signaling overhead may be reduced. The same control messages may be used by multiple terminal devices and, as a consequence, the reduction of the signaling overhead scales with the number of terminal devices using the TOA positioning for acquiring the network clock. The reduction in the signaling overhead results also in reduction in power consumption of the terminal device and reduced processing in the access nodes.

Figure 8:
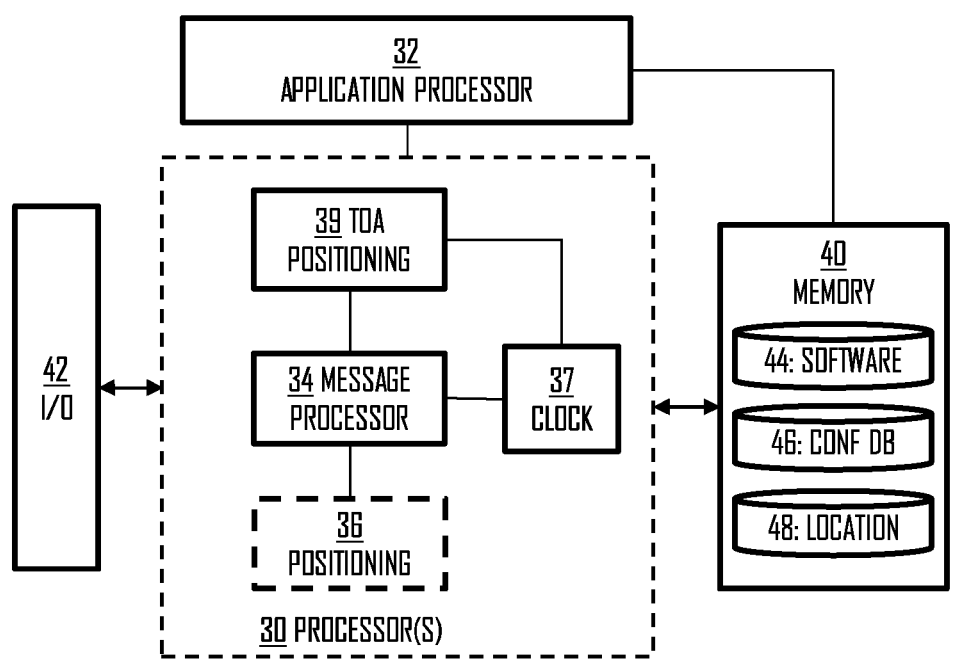
FIG. 8 illustrates a block diagram of a structure of an apparatus according to an embodiment.

FIG. 8 illustrates an apparatus comprising a processing circuitry 30, such as at least one processor, and at least one memory 40 including a computer program code (software) 44, wherein the at least one memory and the computer program code (software) are configured, with the at least one processor, to cause the apparatus to carry out the process of FIG. 3 or any one of its embodiments described above. The apparatus may be for the terminal device. The apparatus may be a circuitry or an electronic device realizing some embodiments of the invention in the terminal device. The apparatus carrying out the above-described functionalities may thus be comprised in such a device, e.g. the apparatus may comprise a circuitry such as a chip, a chipset, a processor, a micro controller, or a combination of such circuitries for the terminal device.

Referring to FIG. 8, the memory 40 may be implemented using any suitable data storage technology, such as semiconductor-based memory devices, flash memory, magnetic memory devices and systems, optical memory devices and systems, fixed memory and removable memory. The memory 40 may comprise a configuration database 46 for storing configuration parameters, e.g. the TOA positioning algorithm. The memory 40 may further store a location database 48 storing the current location of the apparatus.

The processing circuitry 30 may comprise a message processor 34 configured to process messages received from the access nodes, e.g. the control messages described above. The message processor may extract from the control messages the above-described information required for the clock synchronization, e.g. the transmission time of the control message(s) and the location(s) of the access node(s) that transmitted the control message(s).

The processing circuitry may further comprise a TOA positioning circuitry 39 configured to execute the TOA positioning algorithm described above. The processing circuitry may further comprise or be connected to a clock 37 that operates the above-described internal clock of the terminal device. In embodiments where the apparatus executes block 501, the message processor may output a transmission time of a control message to the clock 37 to initialize the clock. Upon executing the TOA positioning and acquiring the synchronized clock value, the TOA positioning circuitry 39 may output the synchronized clock value to the clock 37, thus synchronizing the clock 37 with the network clock.

The processing circuitry may further comprise another positioning circuitry 36 realizing at least a part of a positioning scheme other than the TOA positioning. In some embodiments, the positioning circuitry 36 comprises at least a part of a GNSS receiver circuitry.

The apparatus may further comprise a communication interface 42 comprising hardware and/or software for providing the apparatus with radio communication capability with one or more access nodes 104 to 104C, as described above. The communication interface 42. The communication interface 42 may comprise hardware and software needed for realizing the radio communications over the radio interface, e.g. according to specifications of an LTE or 5G radio interface.

The apparatus may further comprise an application processor 32 executing one or more computer program applications that generate a need to transmit and/or receive data through the communication controller 30. The application processor may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. The application processor may generate data to be transmitted in the wireless network.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention. The processes or methods described in FIGS. 3 to 7 or any of the embodiments thereof may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus comprising:
at least one processor; and
at least one memory storing instructions that, when executed by the at least one processor, cause the apparatus at least to:
receive a control message from at least one access node, the control message comprising a first clock value indicating a transmission time of the control message;
determine a geographical location of the apparatus and a geographical location of the at least one access node;
compute, on the basis of the geographical locations of the apparatus and the at least one access node and further on the basis of the first clock value transmission time of the control message, a second clock value indicating a reception time of the control message at the apparatus; and
update a clock of the apparatus by using the second clock value.

2. The apparatus of claim 1, wherein the apparatus is caused to receive the control message, compute the clock value, and update the clock in an idle state.

3. The apparatus of claim 1, wherein the apparatus is caused to compute the second clock value by using time-of-arrival positioning and to determine the geographical position of the apparatus by using a positioning method other than the time-of-arrival positioning.

4. The apparatus of claim 1, wherein the control message is a first control message received from a first access node and further comprises at least one information element indicating a geographical location of the first access node, wherein the apparatus is caused to further:
receive, from a second access node, a second control message comprising a third clock value indicating a transmission time of second control message and at least one information element indicating a geographical location of the second access node;
receive, from a third access node, a third control message comprising a fourth clock value indicating a transmission time of third control message and at least one information element indicating a geographical location of the third access node;
record reception times of the first control message, second control message, and third control message by using the clock of the apparatus; and
determine the geographical location of the apparatus together with the second clock value by using time-of-arrival positioning algorithm, the geographical locations of the access nodes, and the recorded reception times contained in the first control message, second control message and third control message.

5. The apparatus of claim 4, wherein the apparatus is caused to select one of the first clock value, third clock value, and fourth clock value as a reference clock value, to determine the geographical location of the apparatus by using a time difference between the reference clock value and the other clock values of the first clock value, third clock value, and fourth clock value, and to compute the second clock value as relative to the reference clock value in the time-of-arrival positioning algorithm.

6. The apparatus of claim 1, wherein the apparatus is caused to receive the control message from multiple access nodes in a synchronous manner, wherein clocks of the multiple access nodes are synchronized to a common clock.

7. The apparatus of claim 1, wherein the apparatus is caused to receive the control message and further control messages from multiple access nodes that are asynchronous with respect to one another and to compute the second clock values by using the control messages.

8. The apparatus of claim 1, wherein the apparatus is caused to update the clock of the apparatus to the first clock value before computing the second clock value.

9. A method comprising:
- receiving, by a terminal device, a control message from at least one access node, the control message comprising a first clock value indicating a transmission time of the control message;
- determining, by the terminal device, a geographical location of the terminal device and a geographical location of the at least one access node;
- computing, by the terminal device on the basis of the geographical locations of the terminal device and the at least one access node and further on the basis of the first clock value transmission time of the control message, a second clock value indicating a reception time of the control message at the terminal device; and
- updating a clock of the terminal device by using the second clock value.

10. The method of claim 9, wherein the terminal device receives the control message, computes the clock value, and updates the clock in an idle state.

11. The method of claim 9, wherein the terminal device computes the second clock value by using time-of-arrival positioning and determines the geographical position of the terminal device by using a positioning method other than the time-of-arrival positioning.

12. The method of claim 9, wherein the control message is a first control message received from a first access node and further comprises at least one information element indicating a geographical location of the first access node, the method further comprising as performed by the terminal device:
- receiving, from a second access node, a second control message comprising a third clock value indicating a transmission time of second control message and at least one information element indicating a geographical location of the second access node;
- receiving, from a third access node, a third control message comprising a fourth clock value indicating a transmission time of third control message and at least one information element indicating a geographical location of the third access node;
- recording reception times of the first control message, second control message, and third control message by using the clock of the terminal device; and
- determining the geographical location of the terminal device together with the second clock value by using time-of-arrival positioning, the geographical locations of the access nodes, and the recorded reception times contained in the first control message, second control message and third control message.

13. The method of claim 12, wherein the terminal device selects one of the first clock value, third clock value, and fourth clock value as a reference clock value, determines the geographical location of the terminal device by using a time difference between the reference clock value and the other clock values of the first clock value, third clock value, and fourth clock value, and computes the second clock value as relative to the reference clock value in the time-of-arrival positioning.

14. The method of claim 9, wherein the terminal device receives the control message from multiple access nodes in a synchronous manner, wherein clocks of the multiple access nodes are synchronized to a common clock.

15. The method of claim 9, wherein the terminal device receives the control message and further control messages from multiple access nodes that are asynchronous with response to one another and computes the second control value by using the control messages.

16. The method of claim 9, wherein the terminal device updates the clock of the terminal device to the first clock value before computing the second clock value.

17. A non-transitory computer readable medium comprising program instructions that, when executed by an apparatus, cause the apparatus at least to:
- receive a control message from at least one access node, the control message comprising a first clock value indicating a transmission time of the control message;
- determine a geographical location of the apparatus and a geographical location of the at least one access node;
- compute, on the basis of the geographical locations of the apparatus and the at least one access node and further on the basis of the first clock value transmission time of the control message, a second clock value indicating a reception time of the control message at the apparatus; and
- update a clock of the apparatus by using the second clock value.

18. The non-transitory computer readable medium of claim 17, wherein the apparatus receives the control message, computes the clock value, and updates the clock in an idle state.

19. The non-transitory computer readable medium of claim 17, wherein the apparatus computes the second clock value by using time-of-arrival positioning and determines the geographical position of the apparatus by using a positioning method other than the time-of-arrival positioning.

20. The non-transitory computer readable medium of claim 17 wherein the control message is a first control message received from a first access node and further comprises at least one information element indicating a geographical location of the first access node, the apparatus is caused to further:
- receiving, from a second access node, a second control message comprising a third clock value indicating a transmission time of second control message and at least one information element indicating a geographical location of the second access node;
- receiving, from a third access node, a third control message comprising a fourth clock value indicating a transmission time of third control message and at least one information element indicating a geographical location of the third access node;
- recording reception times of the first control message, second control message, and third control message by using the clock of the terminal device; and
- determining the geographical location of the terminal device together with the second clock value by using time-of-arrival positioning, the geographical locations of the access nodes, and the recorded reception times contained in the first control message, second control message and third control message.

* * * * *